May 1, 1934.    D. M. CARPENTER    1,956,560
LIQUID GAUGE
Filed Feb. 25, 1930    2 Sheets-Sheet 1

INVENTOR.
DONALD M. CARPENTER
BY A.B.Bowman
ATTORNEY

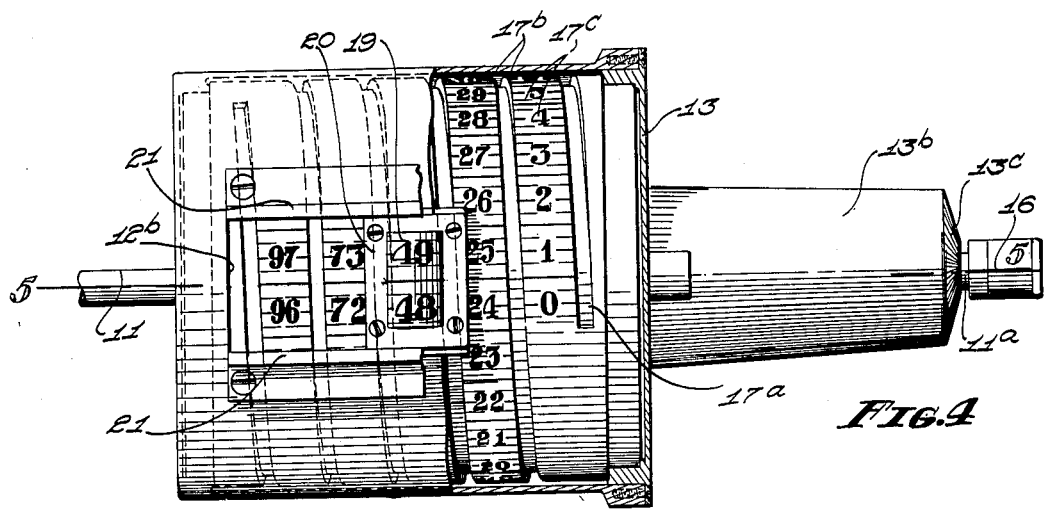

Patented May 1, 1934

1,956,560

UNITED STATES PATENT OFFICE 1,956,560

LIQUID GAUGE

Donald M. Carpenter, Coronado, Calif.

Application February 25, 1930, Serial No. 431,081

8 Claims. (Cl. 73—82)

My invention relates to liquid gauges and the objects of my invention are:

First, to provide a gauge of this nature which is particularly accurate and positive of operation.

Second; to provide a gauge of this nature in which improper or false readings caused by failure of the float or mechanism connected therewith, is reduced to a minimum, and which should the gauge fail, the fact is immediately apparent upon attempting to set the gauge for reading, thereby eliminating the possibility of relying upon false readings.

Third; to provide a device of this class in which the work required of the float is reduced to a minimum.

Fourth; to provide a device of this class which, when used in connection with tanks installed on vessels or the like, is adapted to give a reasonably accurate reading even though the vessel should be rolling or listing.

Fifth; to provide a gauge of this nature which may be readily used with tanks of any size or shape.

Sixth; to provide a gauge of this nature which is especially suited for measuring viscous liquids, which by their nature tend to clog the conventional gauge, and Seventh; to provide on the whole a novelly constructed gauge which is particularly simple of construction and of operation, durable in its action and which will not readily deteriorate or get out of order.

Figure 1:
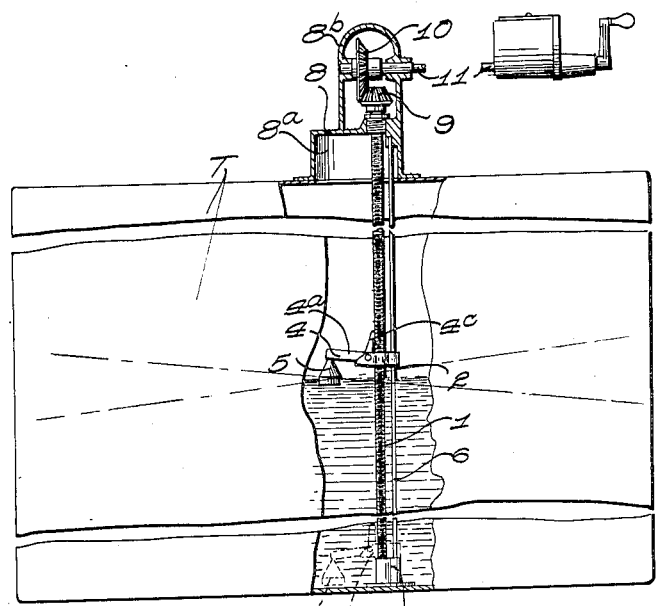
Figure 2:
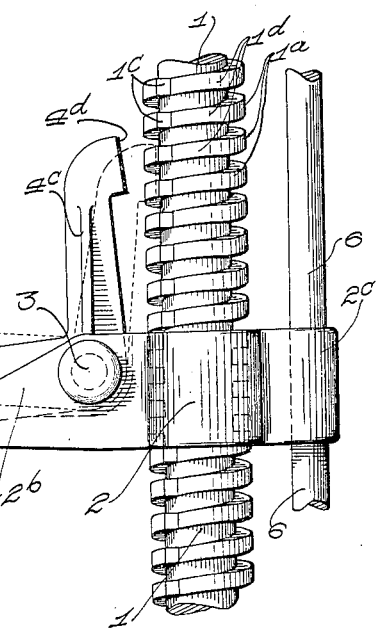
Figure 2:
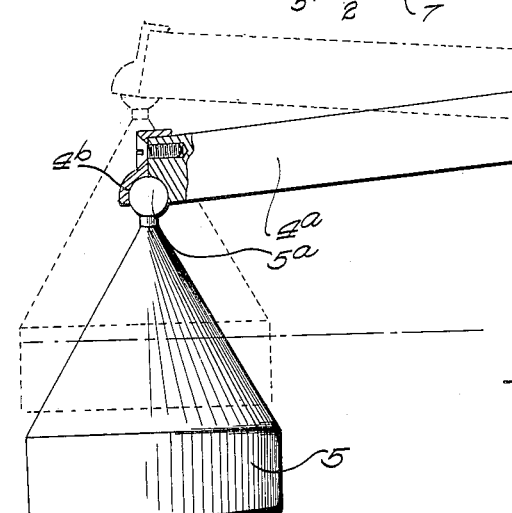
Figure 3:
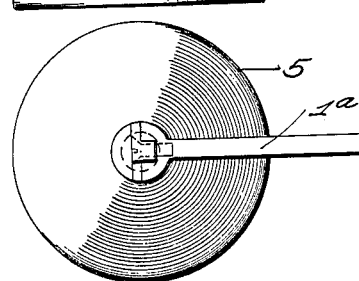
Figure 3:
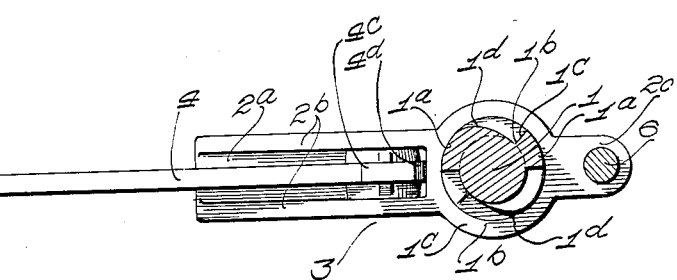

With these and other objects in view as will appear hereinafter, my invention consists of certain novel features of construction, combination and arrangement of parts and portions as will be hereinafter described in detail and particularly set forth in the appended claims, reference being had to the accompanying drawings, and to the characters of reference thereon which form a part of this application, in which:

Fig. 1 is a substantially diagrammatical view of my gauge shown in relation to a tank; Fig. 2 is an enlarged side elevational view of the float and adjacent mechanism with portions as shown in section; Fig. 3 is a plan view thereof, with the float actuating screw and guide member shown in section; Fig. 4 is a plan view of the indicating mechanism with a portion of the casing broken away and in section; Fig. 5 is a fragmentary view thereof through 5—5 of Fig. 4, with parts and portions shown in elevation; and Fig. 6 is a transverse sectional view thereof through 6—6 of Fig. 5.

Similar characters of reference refer to similar parts and portions throughout the several views of the drawings.

Float actuating screw 1, traveler member 2, journal 3, float lever 4, float 5, guide rod 6, fitting 7, casing 8, gears 9, and 10, drive shaft 11, indicator housing 12, end plate 13, clutch mechanism 14, spring 15, crank member 16, indicator drum 17, traveling pointer 18, reading glass 19, frame 20, retainers 21, and gear train 22 constitute the principal parts and portions of my novel gauge.

Vertically disposed in the tank T, is a float actuating screw having coarse screw threads $1a$ thereon. A traveler member or float support 2 is screwthreaded upon the member 1.

Extending from the one side of the traveler member 2 is an arm $2a$ having web portions $2b$ extending up from its side margins. Mounted between the web portions is a journal pin 3. A float lever is journaled intermediate its ends on the journal pin 3. The longer arm $4a$ of the float lever 4 extends outwardly from the screw 1 to a point aproximately coinciding with the longitudinal axis of the tank, as shown best in Fig. 1.

Suspended from the extended end of the arm $4a$ is a float 5. The upper end of the float 5 is provided with a ball portion $5a$ which fits in a corresponding socket means $4b$ which is formed in the end of the arm $4a$ as shown best in Fig. 3. Thus the float is free to pivot about its point of support. This enables the float to more readily adapt itself to the level of water within the tank.

Positioned in parallel disposed relation to and adjacent the actuating screw 1 is a guide rod 6. The traveler member 2 is provided with a sleeve portion $2c$ which fits around the guide rod so as to prevent the traveler member from rotating with the actuating screw.

The float lever 4 is provided with a relatively short upwardly extending arm $4c$ having a laterally projecting end portion $4d$ adapted to engage the screw thread $1a$. The actuating screw 1 is provided with one or more longitudinally extending notches $1b$ which intersect the screw threads $1a$. The one wall $1c$ of each notch $1b$ extends radially with respect to the actuating screw, while the remaining portion $1d$ thereof forms a cam surface which merges gradually into the normal contour of the screw threads.

Thus, when the end of the arm $4a$ is raised, as when the float 5 is buoyed up by the liquid in the tank, the projecting portion $4d$ enters one of the notches $1b$. When this occurs, the actuating screw cannot be turned so as to depress the float further into the liquid as the abrupt wall of the notch 1b engages the projecting portion 4d. However, the screw member may be turned in the opposite direction so as to raise the traveler member by reason of the cam surfaces 1d. The reason for this will be brought out more clearly hereinafter.

The lower ends of the actuating screw and guide rod are journaled in a suitable fitting 7 mounted in the lower end of the tank T. The fitting 7 is of sufficient height so that when the traveler member has reached its lowest position, the float is just clear of the bottom of the tank, as shown in Fig. 1.

The upper ends of the actuating screw and guide rod extend into a casing 8 fitted on top of the tank T. The casing is provided with a chamber 8a in its lower end communicating with the tank T for receiving the float and traveler member so that the float may register for the full height of the tank. Above the chamber 8a the casing 8 is provided with a gear housing 8b through the lower wall of which extends the actuating screw 1. The upper end of the actuating screw 1 is provided with a pinion gear 9, which meshes with a drive gear 10 mounted on a transversely extending drive shaft 11.

The drive shaft 11 extends through the housing 12 of the indicator mechanism. The indicator mechanism may be mounted in any convenient place by using a flexible drive shaft or any other suitable mechanical transmitting means.

The indicator housing 12 is in the form of a cylinder closed at its one end and provided with a bearing 12a therein for receiving the shaft 11. The open end of the casing is closed by an end plate 13, also having a bearing 13a for supporting the shaft 11.

The end plate 13 is provided with a hollow extension concentric with the shaft 11, in which is mounted a friction clutch 14 comprising a first friction disk 14a secured to the shaft 11, and a second friction disk 14b secured to a stub shaft 11a, which is in axial alinement with the shaft 11. The stub shaft 11a is mounted in a suitable bearing 13c provided in the extension 13b. The protruding end of the stub shaft 11a is provided with a crank lever 16.

A spring 15 resiliently holds the members of the friction clutch in engagement one with the other. Revolubly mounted in the housing 12 is an indicator drum 17. The drum 17 is of relatively large diameter fitting close to the side walls of the housing so that the shaft 11 extends therethrough, as shown in Figs. 5 and 6.

The indicator drum is provided with a helical groove 17a formed in the periphery thereof. A traveling pointer 18 is provided having feet portions 18a which fit in adjacent convolutions of the groove 17a, as shown best in Fig. 5. The feet portions 18a are connected together by web portions 18b at their ends, so as to form a rectangular opening 18c exposing a portion of a helical ridge 17b formed between the convolutions of the groove 17a. Mounted over the space 18c is a reading glass 19 which is held in place thereon by a frame 20.

The traveling pointer is exposed by a slit 12b in the housing extending longitudinally with the axis of the drum. The webs 18b of the traveler overhang the margins of the slit 12b so as to slide therealong. The traveler member is held in place by retainers 21, which overhang the side margins of the slit 12b, as shown best in Fig. 6.

Printed or otherwise formed on the raised strip between the adjacent convolutions of the groove 17a is a scale 17c graduated according to the tank with which it is used.

The drum 17 is provided with gear teeth 17d forming an internal gear. Secured upon the shaft 11 is a drive gear 11b. A gear train 22 connects the pinion gear 11b to its internal gear 17d.

The gauge is operated as follows:

When desiring to make a reading, the crank 16 is manually turned driving the shaft 11, thereby rotating the actuating screw 1, and causing the traveler member 2 to move downwardly. When the float 5 engages the upper surface of the liquid, the lever 4 is rotated so that the projection 4d engages one of the notches 1b preventing further rotation of the actuating screw.

By reason of the gear train 22, the drum 17 is rotated with the shaft 11. Upon the locking of the actuating screw, the traveling pointer 19 of the indicator drum comes to a stop so that the scale 17c may be readily read by looking through the reading glass 19. The glass may magnify the scale as shown in Fig. 4. Thus, as shown in Fig. 4, the indicator reads 48½ gallons, cubic feet or other units, indicating the amount of liquid within the tank.

The friction clutch 14 serves to permit the crank 16 to be turned after the screw 1 is locked, thus reducing to a minimum the liability of injuring the apparatus.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a liquid gauge, a float, a support therefor, means for raising and lowering said support within a tank for liquids, said support arranged to interlock with said means upon contact of said float with said liquid to prevent further operation of said means, and an indicator drum provided with a scale and actuated in accordance with the movement of said means, and a pointer arranged to coact with said scale whereby the level of liquid within said tank may be registered by reason of the interlocking of said support and said means.

2. In a liquid gauge, a rotatable screw means disposed in a tank for liquids, a traveler member shiftable longitudinally on said screw means, a float lever supported by said traveler member, a float connected to said float lever, said lever arranged to interlock with said screw means upon contact of said float with a liquid within said tank, and an indicator means controlled by said screw means and traveler member for indicating the level of a liquid within said tank by reason of the interlocking of said support and said means.

3. In a liquid gauge, a float, a support therefor, means for raising and lowering said support within a tank for liquids, said support arranged to interlock with said means upon contact of said float with said liquid to prevent further operation of said means, and an indicator drum provided with a scale and actuated in accordance with the movement of said means, and a pointer arranged to coact with said scale, said drum arranged to lock against rotation upon the binding of said means, whereby said traveler pointer registers with a point on said scale corresponding to the level of the liquid in said tank.

4. In a liquid gauge, a rotatable screw means disposed in a tank for liquids, a traveler member shiftable longitudinally on said screw means, a float lever supported by said traveler member, a float connected to said float lever, said lever arranged to interlock with said screw means upon contact of said float with a liquid within said tank to prevent further operation of said means, and an indicator drum provided with a scale and actuated in accordance with the movement of said means, and a pointer arranged to coact with said scale said drum arranged to lock against rotation upon the binding of said screw means whereby said traveler pointer registers with a point on said scale corresponding to the level of the liquid in said tank.

5. In a liquid gauge, a screwthreaded shaft, vertically disposed within a tank for liquid, a traveler member therefor longitudinally shiftable as said shaft is rotated, a lever supported by said traveler member, a float supported by said lever, said lever having an arm arranged to engage said shaft upon contact of said float with a liquid within said tank, said shaft provided with notch means arranged to interlock with said lever arm when said shaft is turned so as to move said float further into said liquid to prevent further operation of said means, and an indicator drum provided with a scale and actuated in accordance with the movement of said means, and a pointer arranged to coact with said scale whereby the level of liquid in said tank may be registered by reason of the locking of said shaft by said lever arm.

6. In a liquid gauge, a rotatable screw means, a traveler member shiftable longitudinally on said screw means, a float lever supported by said traveler member, a float connected to said float lever, said float lever arranged to interlock with said screw means upon contact of said float with a liquid, an indicator drum cooperating with said screw means, provided with a scale upon said drum, a traveler pointer arranged to coact with said scale, whereby the level of a liquid may be indicated by reason of the interlocking of said float lever with said screw means.

7. In a liquid gauge, a float, a support therefor, screw means for raising and lowering said support within a tank for liquids, said support arranged to interlock with said screw means upon contact of said float with said liquid to prevent further operation of said means, and an indicator drum provided with a scale and actuated in accordance with the movement of said means, and a pointer arranged to coact with said scale whereby the level of liquid within said tank may be registered by reason of the interlocking of said support and said screw means.

8. In a liquid gauge, a rotatable screw means disposed in a tank for liquids, a traveler member shiftable longitudinally on said screw means, a float lever supported by said traveler member, a float connected to said float lever, said float lever arranged to interlock with said screw means upon contact of said float with a liquid within said tank to prevent further operation of said means, and an indicator drum provided with a scale and actuated in accordance with the movement of said means, and a pointer arranged to coact with said scale whereby a level of liquid within said tank may be registered by reason of the interlocking of said support and said screw means.

DONALD M. CARPENTER.